March 28, 1939. O. VON GRUBER 2,152,309
APPARATUS FOR PLOTTING THE SITE PLAN OF A LANDSCAPE
Filed Dec. 11, 1936
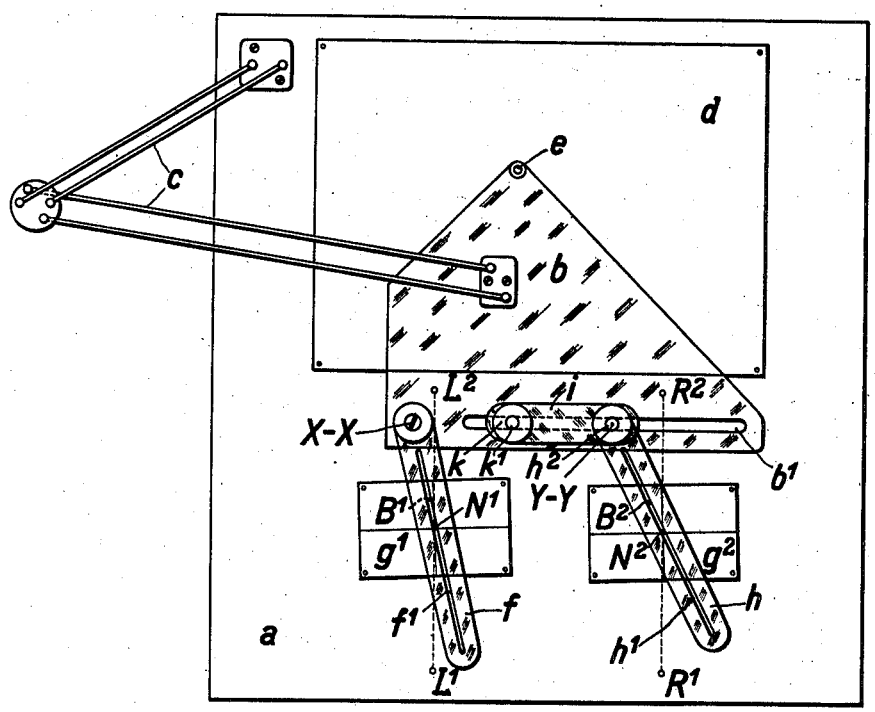
Inventor:
Otto v. Gruber Patented Mar. 28, 1939

2,152,309

UNITED STATES PATENT OFFICE 2,152,309

APPARATUS FOR PLOTTING THE SITE PLAN FOR A LANDSCAPE

Otto von Gruber, Jena, Germany, assignor to the firm Carl Zeiss, Jena, Germany

Application December 11, 1936, Serial No. 115,318
In Germany December 14, 1935

1 Claim. (Cl. 33—79)

I have filed an application in Germany December 14, 1935.

The invention concerns an apparatus which is used for plotting the site plan of a landscape reproduced by two stereoscopic images obtained by vertically photographing from aircraft, and which has two rulers in juxtaposition of and so adjustable relatively to the images as to ascertain by intersection the map point corresponding to a pair of radial lines determined in each of the images by a fixed point, for instance the principal point, and any other image point.

The invention greatly simplifies the construction of such apparatus by so disposing the two rulers on a support containing the plotting pencil as to be rotatable about two axes having an adjustable distance apart and by providing a device for adjusting the support relatively to the plotting surface without the direction of the line connecting the axes of rotation of the two rulers having to be altered. To avoid the view of the images being disturbed by the support, it is advisable to make this support of transparent material.

The accompanying drawing illustrates a top plan view of an apparatus according to the invention.

A support $b$ of transparent material is so mounted on a table $a$ by means of a link mechanism $c$ as to be displaceable parallel to itself in any direction on a drawing paper $d$ pinned to the table $a$. By means of a plotting pencil $e$ placed in the support $b$, the position of the support $b$ relative to the drawing paper $d$ can be marked on this paper. On the support $b$ is mounted a transparent ruler $f$ which is rotatable about an axis X—X at right angles to the surface of the table $a$ and is in such frictional contact with the support $b$ as to remain in any position it is given by hand, no special clamping device being required. In the ruler $f$ is a radial slit $f^1$ for adjusting this ruler $f$ according to the line connecting two image points of a left image $g^1$ pinned to the table $a$ and being the one of the two images of a photostereogram obtained by taking two vertical photographs of a landscape from aircraft. A ruler $h$ is mounted on a slide $i$ and rotatable about an axis Y—Y parallel to the axis X—X. The slide $i$ has two bores containing the journal $h^2$ of the ruler $h$ and the screw $k^1$ of a clamping nut $k$ which adjusts the slide $i$ relatively to the support $b$. The journal $h^2$ and the screw $k^1$ engage in a slit $b^1$ so positioned in the support $b$ that the plane determined by the axes of the said journal and the said screw contains the axis X—X. In this slit $b^1$, the slide $i$ can be displaced lengthwise relatively to the support $b$. In the ruler $h$ is a radial slit $h^1$ for adjusting this ruler $h$ relatively to the right image $g^2$ of the photostereogram pinned to the table $a$ and according to the line connecting two points. $N^1$ and $N^2$ are the plumb points of the images $g^1$ and $g^2$, respectively, and $B^1$ and $B^2$ designate images of a point of the landscape which correspond to each other.

The apparatus is in condition for use when the two images $g^1$ and $g^2$ are so pinned to the table $a$ that the line connecting the plumb points $N^1$ and $N^2$ is parallel to the slit $b^1$ and contains the images of those points of the landscape which had been in the perpendicular plane containing the two air positions of the camera, and when the slide $i$ is so adjusted that the difference of the distance apart of the plumb points $N^1$ and $N^2$ and the distance apart of the axes of rotation X—X and Y—Y of the rulers $f$ and $h$ corresponds to the line connecting the two air positions of the camera and reproduced on the scale on which a map is to be drawn. When using the apparatus, the link mechanism $c$ and the support $b$ are to be so adjusted and the rulers $f$ and $h$ so rotated about their axes X—X and Y—Y for each ground point to be plotted that the slit $f^1$ covers on the left ground photograph $g^1$ the ground-point image and the plumb point $N^1$, and that the slit $h^1$ covers on the right ground photograph $g^2$ the ground-point image and the plumb point $N^2$. When the two image points of the ground point to be plotted lie near the line connecting the two plumb points $N^1$ and $N^2$, it is advisable to effect previously to the aforesaid adjustment two auxiliary adjustments which differ from the said adjustment in that, instead of the plumb points $N^1$ and $N^2$, auxiliary points $L^1$, $R^1$ and $L^2$, $R^2$, respectively, are used for finding two map points, $L^1$ and $L^2$ being in a line at right angles to the slit $b^1$ and containing $N^1$, $R^1$ and $R^2$ being in a line at right angles to the slit $b^1$ and containing $N^2$, and the distances of the auxiliary points from the plumb points being determined by the equation $$L^1N^1 = L^2N^1 = R^1N^2 = R^2N^2$$

The line connecting the two map points thus determined is in this case a locus for the sought site point on the map. The determination of the sight point in this connecting line is effected by using the image points and the plumb points $N^1$ and $N^2$ themselves.

An especially exact adjustment of the rulers $f$ and $h$ can be effected by viewing the images $g^1$ and $g^2$ by means of a stereoscope placed on the table $a$. Instead of radial slits, the two rulers may eventually have radial or double lines.

I claim:

An apparatus for plotting the site plan of a landscape from two stereoscopic images obtained by photographing said landscape vertically from aircraft, said apparatus comprising a stationary plate, a displaceable plate and means interconnecting said plates for universal parallel motion of said displaceable plate in a plane, said means consisting of two link-parallelograms hinged together, a plotting pencil disposed in said displaceable plate and coordinated to a plotting surface parallel to said plane, two rules mounted on said displaceable plate and rotatable about axes at right angles to said plane, the distance apart of said axes being variable, and means for displacing at least one rule relatively to said displaceable plate along a line intersecting said axes at right angles, each of said rules being adapted to determine a straight line intersecting at right angles the axis of rotation of said rule.

OTTO V. GRUBER.